United States Patent [19]
Klasson

[11] 3,832,513
[45] Aug. 27, 1974

[54] STARTING AND STABILIZING APPARATUS FOR A GAS-TUNGSTEN ARC WELDING SYSTEM

[76] Inventor: George A. Klasson, 4430 Azalea Ln., North Olmsted, Ohio 44070

[22] Filed: Apr. 9, 1973

[21] Appl. No.: 348,877

[52] U.S. Cl. ............... 219/75, 219/121 P, 219/136
[51] Int. Cl. ............................................. B23k 9/16
[58] Field of Search ........... 219/74, 75, 121 P, 130, 219/131, 135, 136, 137; 315/330, 331, 332

[56] References Cited
UNITED STATES PATENTS

| | | | |
|---|---|---|---|
| 1,817,799 | 8/1971 | Becq | 315/331 |
| 2,516,037 | 7/1950 | Williams | 219/131 R |
| 2,798,937 | 7/1957 | Miller | 219/131 R |
| 2,892,072 | 6/1959 | Miller | 219/131 W R |
| 2,993,984 | 7/1961 | Sullivan | 219/131 R |
| 3,086,103 | 4/1963 | Hackman et al. | 219/74 |
| 3,471,678 | 10/1969 | Hodder | 219/130 |
| 3,546,424 | 12/1970 | Howie, Jr. | 219/131 |

FOREIGN PATENTS OR APPLICATIONS

| | | | |
|---|---|---|---|
| 1,003,250 | 9/1965 | Great Britain | 219/131 R |

*Primary Examiner*—J. V. Truhe
*Assistant Examiner*—Clifford C. Shaw

[57] ABSTRACT

A method and apparatus for starting and stabilizing an arc in the gas-tungsten arc welding system and the like. A plasma flame extending from the tungsten electrode to the work is established by ionizing a portion of the flow of inert gas used for shielding. The gas is ionized by means of an auxiliary arc that is struck between the tungsten electrode and a second metal component of the torch acting as a second electrode. The resulting plasma flame provides a conductive path for starting and stabilizing the main arc struck between the tungsten electrode and the work.

2 Claims, 4 Drawing Figures

STARTING AND STABILIZING APPARATUS FOR A GAS-TUNGSTEN ARC WELDING SYSTEM

BACKGROUND OF THE INVENTION

This invention relates to arc welding systems such as the gas-tungsten arc system and especially to the starting and stabilizing of the main welding arc. More particularly the invention relates to a method and apparatus for starting the main welding arc by establishing a conductive path for the arc before the arc is struck and without the need for any initial physical contact between the tungsten electrode and the work, and also for stabilizing the main welding arc without requiring precision control by the operator of the spacing between the electrode and the work during the welding operation. The invention relates principally to the gas-tungsten arc welding system referred to hereinafter as G.T.A., but is not limited to that application and may be used advantageously in other types of arc welding systems.

The striking or starting of a welding arc in the G.T.A. system according to conventional practices, can involve difficult procedures and require an extremely high degree of skill on the part of the operator. The conventional technique for starting a DC arc comprises "scratching" the tungsten electrode across the work surface to short circuit the electrode and the work and then withdrawing it slightly to establish the arc. This technique often causes either contamination of the electrode tip with metal from the work, or fusing of the electrode tip to the work. The latter problem usually results in the electrode being broken when the operator attempts to free the torch, and the electrode must then be reground.

Another problem inherent in G.T.A. arc starting, when the welding power source is AC, is the requirement for the use of a super imposed high frequency, on the AC, to enhance starting and to maintain the main arc. The high frequency voltage can cause serious radio interference problems in surrounding areas and often times resolve only by costly installations such as special shielding.

Furthermore, in order to maintain the welding arc between the electrode and the work the operator or welder must very accurately and precisely control the distance from the tip of the surface to the work or weld puddle (e.g. between 3/32 inch and 1/8 inch). If the gap increases beyond a certain limit, an arc outage will result, and a new starting procedure must be undertaken.

If the space becomes to small the electrode may touch the weld puddle resulting in contamination of the tip and the weld. As a result where contamination occurs, the operator must inevitably stop welding, grind a new point on his electrode and remove the contaminated portion of the weld.

One approach to solving the problems indicated above is to provide a conductive path between the tungsten electrode and the work using, for example, a plasma flame. One apparatus for accomplishing this result is disclosed in U.S. Pat. No. 3,309,564. According to that disclosure there is provided, in addition to the main welding torch, an auxiliary plasma torch that is separate and remote from the main welding torch. This auxiliary torch is angularly disposed relative to the main welding torch and its nozzle is so positioned that a plasma flame generated by the auxiliary torch is directed diagonally to the space between the main welding tungsten electrode and the work.

According to this method, however, the plasma flame is started using a high frequency voltage of the same order as that used to start an arc in a more conventional type of arc welding torch. The principle distinction between the use of high frequency voltage in this system, as opposed to the more conventional system, is that the high frequency voltage need not be transmitted from the main welding power supply but from a separate remote unit located relatively close to the plasma torch used for starting.

The method and apparatus of the present invention, however, reduce the difficulties indicated above and afford other features and advantages heretofore not obtainable.

SUMMARY OF THE INVENTION

It is among the objects of the present invention to start a welding arc and stabilize the arc once started without the need for preliminary contact between the tungsten electrode and the work or for maintaining very precisely the spacing between the electrode tip and the work.

Another object is to enable a welder to start a welding arc and to stabilize the arc once started with a minimum of skill and training.

Still another object is to provide an improved method and apparatus for starting and stabilizing a welding arc in a G.T.A. system.

A further object is to eliminate high frequency voltages conventionally used in starting a welding arc in a system using an AC power supply.

These and other objects are accomplished by means of the novel method and apparatus of the invention. According to the invention there is provided, in association with a conventional G.T.A. system which includes as conventional components, a torch with a nozzle, a tungsten electrode within the nozzle and a main power source connected between the electrode and the work for establishing a main welding arc. Also a gas supply system is provided for establishing a flow of inert shield gas through the nozzle to protect the tungsten electrode and the weld puddle.

In accordance with the improvement of the invention there is provided a contact means, electrically connected to an electrode element associated with the torch body, movable from a position contacting the tungsten electrode or metal attachment thereto, to a position spaced from the electrode, so as to establish an auxiliary arc in the path of the flow of shield gas through the nozzle. An auxiliary power source is connected between the tunsten electrode and the other electrode element for establishing an auxiliary-arc-sustaining electrical potential difference therebetween. With additional circuitry provided to suit the circumstances, the power for the auxiliary arc may be taken from the main power source.

The auxiliary arc when established serves to ionize a portion of the shield gas flowing through the nozzle and thus to establish a plasma flame extending an appreciable distance beyond the exit end of the torch nozzle. The plasma flame provides a conductive path for starting and stabilizing the main arc.

According to the method of the invention a gas-tungsten arc welding torch is started, i.e., the main welding arc is struck and stabilized in accordance with the following steps:

A flow of shield gas is initiated in the zone surrounding the tungsten electrode and out the torch nozzle, after which a conductive element that is initially contacting the tungsten electrode in the path of the flow of inert gas is moved out of contact with the electrode (such as by temperature-responsive bimetallic means) to a spacing through which an auxiliary rc is struck and maintained by an appropriate auxiliary power source. The arc serves to ionize a portion of the shield gas to establish a plasma flame extending from the vicinity of the electrode to the work.

Where a bi-metallic element is used, the auxiliary arc gap is maintained due to the heating effect on the bi-metallic element by the auxiliary arc current and/or by the reflected heat of the welding arc. When this arc is shut off, the element cools, bringing it back in starting contact with the tungsten electrode and ready for the next start.

Following the establishment of the plasma flame, the power supply circuit establishing a potential difference between the workpiece and the electrode, is energized to strike an arc through the conductive path provided by the plasma flame from the electrode to the work. The arc is stabilized during the welding operation irrespective of variations between the electrode and the work by maintaining the plasma flame between the electrode and the work.

DESCRIPTION OF THE PREFERRED EMBODIMENT

Figure 1:
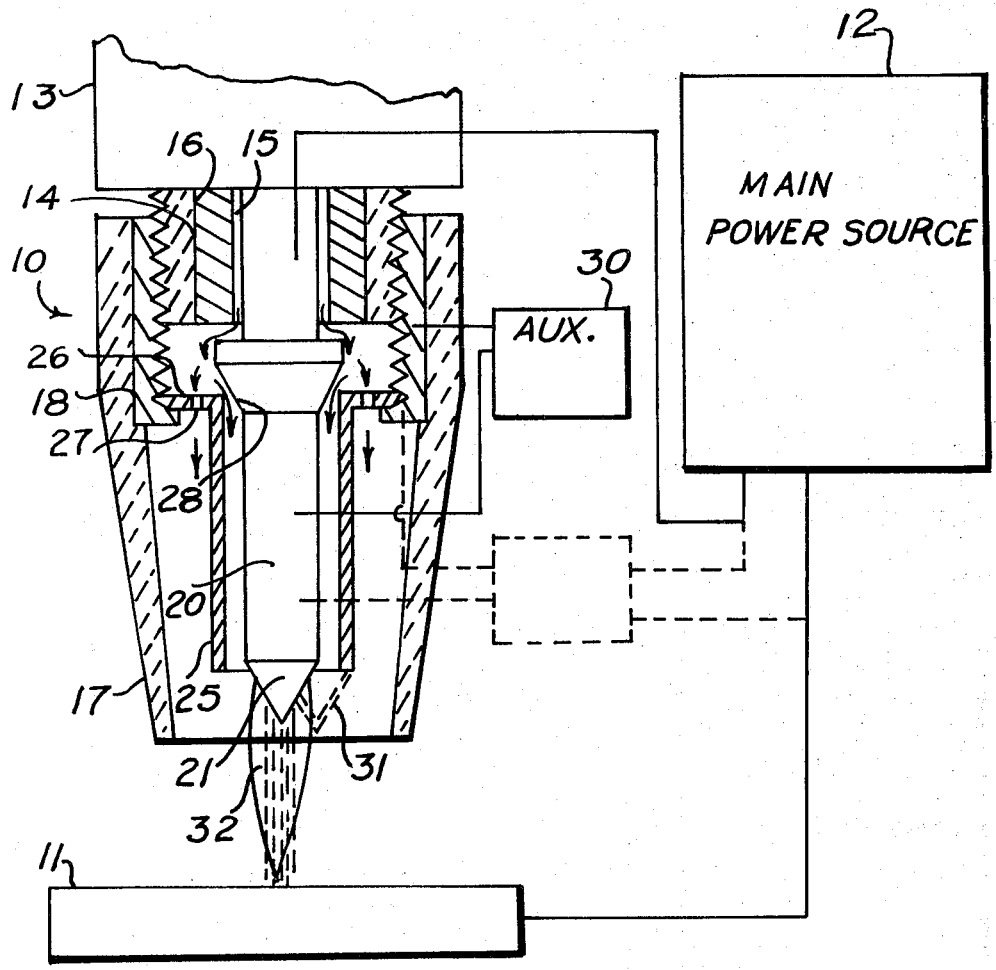
FIG. 1 is a fragmentary cross sectional view through the center of a welding torch embodying the invention, the electrical power supplies and the work to be welded being shown schematically.

Referring more particularly to the drawings and initially to FIG. 1 there is shown a G.T.A. welding torch 10 embodying the invention and positioned for performing a welding operation on a workpiece 11. A main power source 12 is connected between the torch electrode and the workpiece 11 to establish the necessary electrical potential difference therebetween for the main welding arc.

The torch 10 comprises a main body 13 with a cylindrical stud 14 protruding therefrom. The stud 14 has flutes 15 in its interior cylindrical wall for a purpose to be described below. Tightly fitted around the stud 14 is a ceramic insulating sleeve 16 with exterior threads.

A ceramic nozzle 17 formed of suitable di-electric material and having it's generally cylindrical tubular wall formed with a tappered forward end is connected to the threaded sleeve 16 by means of an annular copper insert 18 with interior threads, the insert being tightly fitted within the nozzle 17. It will thus be seen that the copper insert 18 is insulated from the main body 13 of the torch 10 and as well as from the stud 14.

Mounted within the main body 13 and extending through the cylindrical stud 14 is a tungsten electrode 20 with a conical tip 21 that has its end spaced slightly behind the forward end of the ceramic nozzle 17. This prevents the electrode tip 21 from either contacting the workpiece 11 or from damage that could result from the tip 21 striking any object in the path of the torch 10.

Surrounding the tungsten electrode 20 is a cylindrical copper gas tube 25 with an annular flange 26. The tube 25 defines with the tungsten electrode 20 an annular space extending a portion of the length of the electrode and communicating with the space within the copper insert 18. An inert gas for shielding is supplied to the space thus defined through the passages defined by the flutes 15 in the interior wall of the stud 14. A portion of the gas passes through the gas tube 25 while another portion passes through ports 27 in the flange 26 and through the space defined by the ceramic nozzle 17 and the gas tube 25. The gas tube 28 may be moved by turning the nozzle 17 and thus the copper insert 18. The threads formed in the insert, by turning on the threads formed on the ceramic sleeve 16 will cause the flange 26 to be moved axially into and out of contact with the shoulder 28.

An auxiliary power source 30 is connected between the copper insert 18 and the tungsten electrode 20 to apply a DC potential across a starting circuit extending through the copper insert 18, the flange 26 and the shoulder 28 of the electrode 20. When the gas tube 25 is out of contact with the shoulder 28 (assuming that the power source 30 is energized) an auxiliary arc 31 will be established between the shoulder 28 of the electrode 20 and the gas tube 25. The inert gas flowing through the tube 25 will tend to "blow" the arc 31 down through the tube to approximately the position illustrated in FIG. 1. Also the arc 31 will ionize the inert gas flowing through the tube 25 to establish a plasma flame 32 between the tip 21 of the electrode 20 and the workpiece 11.

Once the plasma flame 32 is established, a main welding arc may be easily started simply by energizing the main power source 12. The plasma flame 32 provides a conductive path through which the main arc can be struck. It will be apparent that this starting procedure eliminates any need for contact between the electrode tip 21 and the workpiece 11 and thus the electrode tip may be advantageously protected by virtue of its location rearwardly of the front end of the ceramic nozzle 17.

In the preferred form of the method of the invention, the auxiliary arc 31 will be maintained throughout the welding operation to maintain the plasma flame 32 through which the main welding arc is established. The conductive path thus provided minimizes the problem of arc outages. The main power source 12 is either a DC or standard AC system and no HF voltage is required. The main power source 12 may also be modified to provide the power for the auxiliary arc as indicated by dashed lines in FIG. 1.

Figure 2:
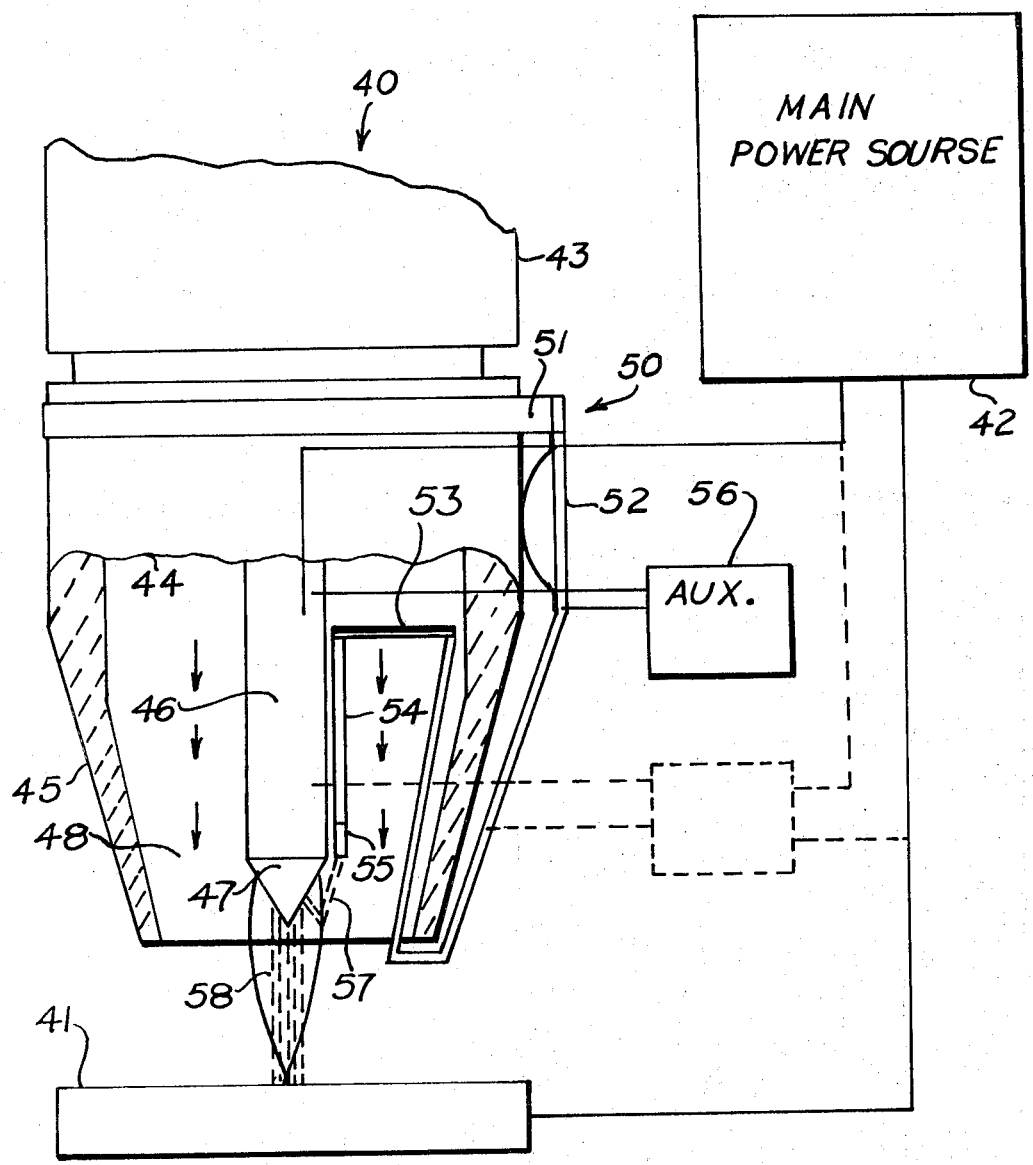
FIG. 2 is a cross sectional view through the center of a welding torch embodying a modified form of the invention with parts broken away and shown in section and with the work and the power supplies being shown schematically.
Figure 3:
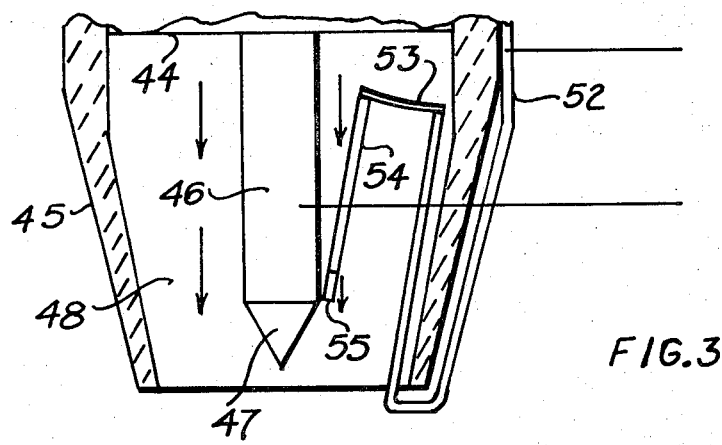
FIGS. 3 and 4 are fragmentary sectional views of the welding torch of FIG. 2 illustrating sequentially the arc starting procedure.
Figure 4:
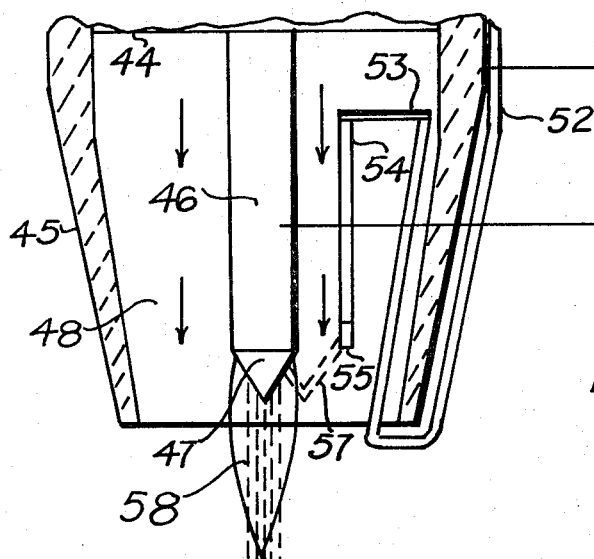

FIGS. 2, 3 and 4

Referring next to FIGS. 2, 3 and 4 there is shown an alternative form of the invention wherein an adaptor unit is used to convert a standard G.T.A. welding torch to a torch capable of utilizing the novel arc starting and stabilizing system of the invention. The torch 40 is of generally conventional design and is shown in FIG. 2 in position to perform a welding operation on a workpiece 41 with the main power source 42 being connected between the torch 40 and the workpiece 41.

The torch 40 has a main body 43 with a threaded boss 44 protruding from its lower end. A cylindrical ceramic nozzle 45 with interior threads is threaded onto the boss 44 the nozzle either being the standard nozzle supplied with the torch or a specially constructed nozzle for use in adapting the torch 40 to the system of the invention. A tungsten electrode 46 is supported by a conventional chuck (not shown) in the main body 43 and is shown with a conical tip 47 spaced behind the forward end of the nozzle 45. This serves to protect the tip 47 of the tungsten electrode 46 as has been described above with respect to the embodiment of FIG. 1. The interior surface of the nozzle 45 and the electrode 46 define an annular space 48 through which a flow of inert shield gas is directed from appropriate porting etc. provided in the main body 43.

In accordance with the invention there is provided an adaptor unit 50 to convert the torch 40 to utilize the novel arc starting and stabilizing system of the invention. The adaptor unit 50 comprises a clamping ring 51 of conventional design which is tightly fitted and clamped around the upper end of the ceramic nozzle 45. A conductor clip broadly indicated by the numeral 52 is carried by the clamping ring 51 and extends downwardly around the forward end of the ceramic nozzle 45 and into the space 48. Within the space 48 the conductor clip has two essentially vertical legs connected together by an inner span 53. The tip of the leg 54 adjacent the electrode 46 can be provided with a tungsten contact tip 55 so that when contacting the tungsten electrode and the advantage of identity of material is provided.

The central span 53 comprises a bi-metallic element that is effective to move the contact tip 55 between the two positions illustrated in FIGS. 3 and 4. In the position illustrated in FIG. 3 the contact tip 55 is engaging the lower end of the tungsten electrode 46. In this condition an auxiliary power source 56 may be used to establish a potential across a starting circuit through the electrode 46 and the conductor clip 52 with appropriate electrical connections being made as illustrated. When the power source 56 is energized, the heat generated by current flow through the bi-metallic element 53 will cause flexure thereof to a "hot" position to move the contact tip 55 out of engagement with the electrode 46 and thus to strike an arc 57 between the electrode 46 and the tip 55. This arc 57, as in the case of the arc 31 of the embodiment illustrated in FIG. 1, serves to ionize a portion of the inert shield gas flowing passed the electrode 46 and thus to establish a plasma flame 58 extending from the vicinity of the electrode tip 47 to the work piece 41.

Once the plasma flame is established the main power source 42 is energized to establish a main welding arc from the tungsten electrode 46 to the workpiece 41. The advantages thus achieved coincide essentially with those described above with respect to the embodiment of FIG. 1.

While the invention has been shown and described with respect to a specific embodiment thereof this is intended for the purpose of illustration rather than limitation and other variations and modifications will be apparent to those skilled in the art all within the intended purpose and scope of the invention. Accordingly the patent is not to be limited in scope and effect to the specific embodiments herein shown and described nor in any other way that is inconsistent with the extent to which the progess in the art has been advanced by the invention.

I claim:

1. Apparatus for starting and stabilizing a welding arc in a gas-tungsten arc portable welding torch comprising:

a torch body formed of electrically conductive material, a nozzle formed of dielectric material threadedly connected to said body, a main electrode connected to said body within said nozzle with its tip located rearwardly of the mouth of said nozzle, an auxiliary electrode secured to and carried by and within said nozzle and axially movable when said nozzle is threaded toward and away from said body between a position contacting said main electrode and a position spaced from said main electrode to establish an auxiliary arc between said electrodes, a main power source connected between said main electrode and the work for establishing a main-welding-arc-sustaining electrical potential difference between said main electrode and the work to be welded, an auxiliary power source for establishing an auxiliary-arc-sustaining electrical potential difference between said electrodes, and means for directing a flow of shield gas through the space between said nozzle and said main electrode and a portion thereof past said auxiliary arc, whereby said auxiliary arc ionizes said portion of said gas to establish a plasma flame; said plasma flame providing a conductive path for starting and stabilizing said main arc.

2. Apparatus as defined in claim 1 wherein said auxiliary power source comprises said main power source and circuit means operatively associated therewith for establishing said auxiliary-arc-sustaining electrical potential difference independently of said main-welding-arc-sustaining electrical potential difference.

* * * * *